United States Patent Office 3,655,825
Patented Apr. 11, 1972

3,655,825
ACRYLIC IMPACT RESISTANT MODIFIERS FOR POLYVINYL CHLORIDE
Louis C. Souder, Levittown, Bjorn E. Larsson, Rushland, and Charles F. Ryan, Warminster, Pa., assignors to Rohm and Haas Company, Philadelphia, Pa.
No Drawing. Continuation of application Ser. No. 394,071, Sept. 2, 1964. This application Mar. 24, 1969, Ser. No. 810,016
Int. Cl. C08f 37/18, 15/18
U.S. Cl. 260—876 R          10 Claims

ABSTRACT OF THE DISCLOSURE

This invention relates to solid, thermoplastic, polymeric products resulting from the polymerization of lower alkyl esters of acrylic and methacrylic acid. It also relates to high impact-resistant materials which result from blends of such products with other polymeric materials, particularly polymers and copolymers of vinyl chloride. The copolymers which are used in such blends typically comprise at least 80% by weight of a polyvinyl halide with up to 20% by weight of another monovinylidene compound copolymerizable therewith, such as vinyl acetate, methyl methacrylate, styrene, or the like.

---

This application is a continuation of pending application Ser. No. 394,071, filed Sept. 2, 1964.

The first step in preparing the new polymeric products of this invention is to form a rubbery polymer by emulsion copolymerizing a lower alkyl ester of acrylic acid and a small amount of a crosslinking monomer such as one chosen from the diacrylate or dimethacrylate esters of a polyfunctional alcohol. This copolymerization takes place with the aid of about 0.5 to about 1.0% of a suitable emulsifier to form an acrylic ester latex. Then, in the presence of this preformed latex a lower alkyl ester of methacrylic acid is polymerized to produce a second or hard polymer under such conditions that essentially no new particles are formed.

The alkyl group in the lower alkyl ester of acrylic acid generally has a value of $C_2$ to $C_8$. The alkyl group can be a straight or branched chain, with the secondary requirement that the glass transition temperature of the first or rubbery polymer, the acrylic ester latex, must be 0° C. or below. The ester must be formed from acrylic acid to give the improved properties of the present invention. When formed from methacrylic acid, for example, the invention will not work satisfactorily as the ultimate polymeric products have very little impact resistance.

The alkyl group in the lower alkyl ester of methacrylic acid generally has a value of $C_1$ to $C_4$. This ester must be formed from methacrylic acid; if formed from acrylic acid the ultimate polymeric products will be unsatisfactory. The alkyl group in this second or hard polymer can be a straight or branched chain, but a secondary requirement is that the polymer must have a glass temperature of 20° C. or higher.

In polymerizing the hard polymer in the pressure of the preformed latex it is essential that new particles be avoided such as would occur if the ester polymerized by itself. This can be prevented by keeping an insufficient supply of the emulsifier present in the second or hard polymer phase. If any emulsifier is added, the amount must not exceed that required to reach the critical micelle concentration. At such low levels of emulsifier, which levels must be determined for each emulsifier used, the entire amount of emulsifier is concentrated on the preformed particles and none is available to form new particles. Thus, the polymerizing poly(methyl methacrylate) will form polymers in the intimate presence of the preformed polyacrylate.

Blends of the products of the present invention with other polymeric materials may be prepared by admixing, such as by means of a roller mill, a Banbury mixer or extruder. If desired, the various blends may be pelletized prior to their use in further forming operations. Heretofore, in the blending of polymeric products with polyvinyl chloride and the like to make impact-resistant materials, the art has resorted to polymers which contain rubber or rubber-like materials such as polymers or copolymers of butadiene. One of the drawbacks to the use of such materials has been the fact that they tended toward oxidative degradation and light instability, becoming discolored on exposure to light. This has now been avoided.

Such drawbacks were due to the fact that the materials are largely unsaturated compounds. By contrast, the polymers formed by the present invention have no substantial concentration of points of unsaturation. They therefore possess far greater resistance to oxidation and are considerably more stable to light, while at the same time making possible significantly improved impact-resistant properties when they are blended with polyvinyl chloride. What is more, the impact resistance is retained throughout the essential lifetime of the end product.

Critical to the success of the present invention is the fact that the polymers of alkyl acrylate, alkyl methacrylate, and cross-linking monomer are formed from certain prescribed percentages of each. Only when properly so formulated are these polymers capable of providing a tremendously increased resistance to impact when they are blended with polyvinyl chloride, as will be demonstrated below.

Similar methacrylate-acrylate polymers, except for the absence of the cross-linking monomer, have been known to make possible considerable improvements over the modified or unmodified polyvinyl thermoplastic material of the prior art. One of the most important advances has been the vastly improved flow properties of the blends which are used to form products by molding under pressure and elevated temperatures, such as by injection molding. Considerable difficulty had been experienced in the past with the inability to make some thermoplastic compositions flow properly so as to fill the entire mold in which certain end products are made.

To overcome these difficulties, the normal expediency has been to increase the pressure and/or increase the temperature under which the injection molding takes place. However, there are several problems when resorting to either of these means; one is that there is a limit to the amount of pressure which may be applied, and thus is a factor of the machines employed; another is that when temperatures become too high there is bound to be decomposition or other adverse effects upon the plastic product.

Unmodified polyvinyl chloride compositions have two inherent limitations. One is their relatively poor flow properties at temperatures which contribute adequate flow to plastics based on polystyrene, polymethyl methacrylate, polyethylene, etc. Another is the thermal instability of polyvinyl chloride at the high temperatures which might be expected to give good flow freely so that higher and higher pressures must be resorted to. It may be necessary to build relatively huge machines in order to be able to develop sufficient pressure to mold the plastic to a desired end configuration. This certainly is undesirable. As for increases in temperature, apart from the inefficiency which results from the necessity to develop the higher energy requirements and the machinery to contain same, resorting to such conditions invariably leads to an end product whose surface finish is rather poor. Even more likely is the possibility that the higher heat will cause a burnt or scorched appearance in the end product.

The aforementioned non-crosslinked methacrylate-acrylate polymers of the prior art, when blended with polyvinyl chloride, has made possible the injection molding of very difficult patterns with greater ease than was previously possible with polyvinyl chloride blends. This has made it possible to avoid having to resort to the excessive pressures and temperatures which so adversely affect the plastic end product, and thereby make possible the molding of plastic shapes that heretofore had defied injection molding techniques.

The principal unexpected advantage of the present invention over that prior art is that the cross-linking in the new product allows much easier mixing of the components before the final blend is fabricated. This will be illustrated below in the examples. The easier mixing is demonstrated by much more ready fluxing on the mill rolls and also by a wider range of mixing times and conditions to reach the desired intimacy of blending needed for optimum properties. The cross-linked polymers more readily reach the desired level of mixing and properties are not harmed by inadvertent over-mixing.

Another unexpected advantage of the present invention over the prior art has to do with the use of lubricants. In non-cross-linked systems, in order to get good impact performance from products prepared with varied processing times the use of special, incompatible lubricants are necessary. Example of such lubricants are the metallic stearates (sodium, calcium, aluminum, barium and cadmium) and other salts of fatty acids. In the case of cross-linked systems it is not absolutely necessary to use such special lubricants in order to obtain good processing conditions, although it generally may be preferable to do so. Any of the conventional lubricants used to process polyvinyl chloride would be useful with the cross-linked systems of the present invention.

In forming the products of the present invention the first stage of the heterogeneous polymer should be composed of a polymer of a lower alkyl acrylate, i.e. one containing from two to eight carbon atoms. Up to 20% of a second monovinylidene monomer copolymerizable therewith may be used, the second monomer having a single vinylidene group ($CH_2=C<$) as the sole polymerizably reactive group, such as alkyl methacrylic esters, acrylic and methacrylic acids and nitriles, vinyl halides, vinyl esters, styrene, vinyl toluene, and the like. Only monomers which, when polymerized, yield a polymer with a glass temperature below 0° C. are suitable, and the preferred ones are ethyl acrylate, butyl acrylate and 2-ethylhexyl acrylate. Particularly preferred, because the resulting heteropolymer imparts good resistance to impact in the blends with polyvinyl chloride at temperatures of 0° C. and below, is butyl acrylate.

The broad concept of using cross-linking monomers in the preparation of alkyl acrylate type polyvinyl chloride modifiers has been known to the prior art, e.g. U.S. Pat. 3,041,309. The present invention, however, by virtue of certain initiators, emulsifiers and other specific synthesis factors, has provided hitherto unattainable thermal stability of the blends with polyvinyl chloride. The level of the cross-linking monomer, which is included in the alkyl acrylate polymer, is critical to the successful result of the present invention; a minimum of 0.1% of the acrylate polymer is required, but excesses over about 5.0% will produce unsatisfactory products. Suitable cross-linkers include divinylbenzene, divinyl esters of di- or tribasic acids (such as divinyl adipate), diallyl esters of polyfunctional acids (diallyl phthalate), divinyl ethers of polyhydric alcohols (divinyl ether of ethylene glycol), and di- and tri-methacrylic and acrylic esters of polyhydric alcohols. Particularly preferred are the commercially available di- and tri-methacrylic and acrylic esters of polyhydric alcohols, since they copolymerize well with acrylic esters, and impart better heat stability to the final blend. Examples are ethylene glycol dimethacrylate, propylene glycol dimethacrylate, 1,3-butylene glycol dimethacrylates, 1,4-butylene glycol dimethacrylate, and the corresponding acrylic esters.

Using conventional emulsion polymerization techniques, the acrylate monomer and the cross-linker are polymerized in the presence of a low level of emulsifier, this being a factor in imparting better heat stability to the final material. A variety of common emulsifiers, useful in the polymerization of acrylic esters, may be used, such as alkylbenzenesulfonates, alkylphenoxypolyethylenesulfonates, sodium lauryl sulfate, etc. In general, the emulsifiers should be compounds containing hydrocarbon groups of 8–22 carbon atoms coupled to highly polar solubilizing groups such as alkali metal and ammonium carboxylate groups, sulfate half ester groups, sulfonate groups, phosphate partial ester groups and the like. It is essential to the successful practice of the invention that the level of emulsifier be kept at one percent or less, based on the final weight of both monomers charged.

The polymerization medium will contain a suitable oil-soluble, water-insoluble, free radical generating polymerization initiator, which is activated either thermally or by an oxidation-reduction (or redox) reaction. The preferred initiators are those which are the result of redox reactions, since they allow rapid polymerization at low reaction temperatures. The water-insoluble initiators are essential as the water-soluble materials cause problems in thermal stability of the end product. Examples of suitable initiators are combinations such as cumene hydroperoxide-sodium metabisulfite, diisopropylbenzene hydroperoxide-sodium formaldehyde sulfoxylate, tertiary butyl peracetate-sodium hydrosulfite, cumene hydroperoxide-sodium formaldehyde sulfoxylate, etc.

The particle size (radius) of the initial latex can bear heavily upon the nature of the product obtained. For systems based on poly(ethyl acrylate) the particle size of the latex should be no less than about 600 angstroms (A.) and no more than about 1200 A. However, for poly (butyl acrylate) systems the initial latex can range from 400–2000 A. Control of the particle size is accomplished by exact control over the amount of initiator and emulsifier employed, and the method of adding the initiator.

The methacrylate ester employed in the second-stage polymerization also should be a lower alkyl ($C_1$ to $C_4$) ester, this one of methacrylic acid. Optionally, one may use a mixture of monomers containing at least 80% of a said $C_1$ to $C_4$ alkyl methacrylate with other monomers copolymerizable therewith, and having a single vinylidene group as the sole polymerizably reactive group, examples being alkyl acrylates, acrylic and methacrylic acids and nitriles, such as vinyl halides, vinyl esters, styrene, vinyl toluene, and the like. Preferred are those lower alkyl esters yielding polymers of highest softening point, so as not to depress the softening point of the overall blend. These include methyl, ethyl, isopropyl, isobutyl, secondary butyl and tertiary butyl methacrylates. Particularly preferred is methyl methacrylate.

It is imperative that the polymerization of the second monomer in an emulsion system be carried out so as not to form new particles. Blends of a cross-linked polyacrylate latex with a latex of poly(methyl methacrylate) do not function as do the teachings of the present invention. To avoid the formation of new particles, it is necessary that no new emulsifier be added, or, if needed to avoid gum, that the amount added not exceed the amount needed to reach the critical micelle concentration. At these low levels of emulsifier, which must be determined for each emulsifier used, all the emulsifier is on the preformed particles and none is available to form new particles. Thus, the polymerizing methacrylate will form polymers in the intimate presence of the preformed acrylate polymer.

The ratio of the hard phase (poly-methacrylate) to soft phase (poly-acrylate) is within the range of 25/60 parts by weight of the former to 75/40 parts by weight of the latter.

The blends with polyvinyl chloride, and the like, may be accomplished on a mill roll. Convenient and customary operating conditions are about 350° F. and from 5 to 15 minutes time. Dry mixing techniques, as with a mechanical mixer-blender device, may be employed. The powder blends may, if desired, be processed in commercial extrusion or injection molding equipment. Milled blends can be compression molded, a convenient temperature being 350° F., at 1800 p.s.i. Injection molding can take place under a variety of conditions, depending mostly on the molecular weight of the polyvinyl chloride used and the equipment employed for the purpose.

Certain processing aids, stabilizers, etc. are often incorporated in the blends. The stabilizers, which serve to prevent the breakdown of the polyvinyl chloride, are of several different types. Some help to stabilize against heat caused distortions; some against ultra-violet light, etc. Typically, such stabilizers are based upon tin, barium or cadmium compounds, as will be seen from the examples below.

The acrylate-methacrylate copolymer is blended in amounts ranging from 5 to 40 parts by weight, with 95 to 60 parts by weight of the polyvinyl halide or equivalent material. The amounts of such new polymeric products which are blended with the polyvinyl halide materials will depend upon the nature of the pre-polymeric backbone of such products, as well as the nature of the properties to be attained in the ultimate blend. For example, when the product is an acrylate having two carbon atoms in the alkyl group, optimum impact strength of the product may require use in the blend of an amount on the order of 15–45% by weight, whereas when the acrylate is one wherein the alkyl group contains eight carbons, the development of optimum impact strength may require amounts on the order of 5–25% by weight.

The blended compositions are tough, rigid, thermoplastic, chemically resistant materials having high impact strength and high heat distortion temperatures. They are particularly useful in forming plastic pipe and extruded products of similar nature, as well as for forming other plastic products such as by molding, calendering, and the like.

The invention described above, and a comparison of some of its characteristics with those of the prior art, is illustrated by the following examples:

EXAMPLE I

Preparation of polymeric polyvinyl chloride modifiers with various acrylic-methacrylic acid esters and varying amounts and kinds of cross-linkers To a suitable reaction vessel is charged 400 parts deionized water, 10 parts of a 10% by weight solution of sodium lauryl sulfate, and 0.1 part glacial acetic acid. The mixture is stirred and to it is added 100 parts of ethyl acrylate. The mixture is purged with nitrogen for 30 minutes, 0.17 part of diisopropylbenzene hydroperoxide added, and the mixture heated to 40° C. To the mixture is added a dilute aqueous solution of sodium formaldehyde sulfoxylate; a total of 0.002 part of the sulfoxylate is added at three minute intervals until polymerization is noted by exotherm. The reaction is then allowed to proceed for at least one hour after the initial exotherm is noted. The temperature of the reaction is then raised to 80–85° C. and a mixture of methyl methacrylate (100 parts) and tertiarydodecyl mercaptan (0.25 part) added over a period of one hour, during which time the temperature of the reaction is maintained at 80–85° C. The mixture is heated for one-half hour more, cooled to room temperature, and the polymer isolated by spray-drying. The product of this reaction is identified as Sample I–A. The same example is repeated, except that there is added to the ethyl acrylate 1,3-butylene glycol dimethacrylate in varying amounts as follows: 0.125; 0.5; 1.0; and 5.0% of the total monomers used. For convenience of reference hereinafter, the products of these reactions are correspondingly identified as Samples I–B; I–C; I–D and I–E.

In a similar manner, the polymerizations are repeated with replacements for the ethyl acrylate. An equivalent weight of 2-ethylhexyl acrylate is substituted for ethyl acrylate, and 0.5% butylene dimethacrylate is used, the polymerization proceeding as when ethyl acrylate is employed to yield an interpolymer which is isolatable by spray-drying. In another experiment methyl acrylate substituted; in a different experiment propyl acrylate is used; in still another experiment sec.-butyl acrylate is employed; in one more experiment n-octyl acrylate is the replacement for ethyl acrylate. In still other experiments, copolymers of ethyl acrylate or the various suggested substitutes therefor are used instead of the monomers themselves.

Likewise, in the same or other experiments, the methyl methacrylate is replaced by ethyl methacrylate, propyl methacrylate, n-butyl methacrylate, or i-butyl methacrylate. Similarly, in the same or other experiments, there is substituted for the 1,3-butylene glycol dimethacrylate various cross-linking monomers such as ethylene glycol dimethacrylate, ethylene glycol diacrylate, divinyl benzene, or diallyl phthalate.

EXAMPLE II

Comparison of modifiers with and without cross-linkers

Each of the modifiers for polyvinyl chloride prepared in Example I above is blended as follows. Thirty parts of the ethyl acrylate-based modifier, 70 parts of a low molecular weight polyvinyl chloride, three parts of aluminum stearate and two parts of a tin stabilizer are blended and milled together at 350° F. at a 40 mil roll separation for various milling times ranging from 3 to 20 minutes. The milled material is then compression molded into suitable test specimens, and Izod notched impact strengths measured at room temperature. Improvements in impact strength are noted even when only 0.125% cross-linking monomer is used. When the level of cross-linker is increased to 0.5 or 1.0%, depending on the system the improvement in impact strength ranges from good to a very dramatic high degree of excellence. At the same time, there is to be noticed more consistent values as a function of milling time.

In another experiment, a modifier based on an interpolymer containing 2-ethylhexyl acrylate is blended in the same formulation (i.e. 30 parts modifier, 70 parts polyvinyl chloride, 3 parts aluminum stearate, 2 parts tin stabilizer) and milled for 10 minutes. The resultant impact strengths are >10 foot-pounds/inch of notch.

In still another experiment, the milled material is injection molded into suitable test specimens, and Izod notched impact strengths measured at room temperature. Improvements in impact strengths are noted which are comparable with those of the specimens obtained by compression molding techniques.

EXAMPLE III

Effect of cross-linkers on range of modifier concentration

Blends are prepared, as in Example II, by milling for seven minutes blends containing X parts of the modifiers identified as Samples I–A and I–D, respectively, in Example I, 100 minus X parts of a low molecular weight polyvinyl chloride, and 3 parts of aluminum stearate. The samples are injection molded into test bars into which test notches are milled, and then subjected to the Izod notched impact strength tests. The results set forth in Table I show the blends containing the modifier with cross-linker are less critical in the ratio of modifier to the polyvinyl chloride which is to be used as well as being greater throughout.

TABLE I

| Modifier | Percent butylene dimethacrylate | Notched Izod impact vs. modifier concentration, X=modifier concentration of— | | | | |
|---|---|---|---|---|---|---|
| | | 10% | 15% | 20% | 25% | 30% |
| I-A | 0 | 2.1 | 3.7 | 13.8 | 18.8 | 6.3 |
| I-D | 1 | 3.6 | 3.7 | 20.8 | 23.0 | 20.1 |

EXAMPLE IV

Preparation of polymeric polyvinyl chloride modifiers with various acrylic-methacrylic acid esters, varying amounts of cross-linker, and various kinds and amounts of modifiers To a suitable reaction vessel are charged 2920 parts of deionized water, 720 parts of n-butylacrylate, 72 parts of a 10% aqueous solution of sodium lauryl sulfate, 7.2 parts of 1,3-butylene dimethacrylate, 0.7 part of glacial acetic acid and 1.21 parts of diisopropylbenzene hydroperoxide. The temperature is raised to 40° C. and the mixture is purged with nitrogen beneath the reaction surface for 45 minutes. Stirring is begun and incremental addition of a solution of 0.33 part sodium formaldehyde sulfoxylate in 25 parts water is carried out until polymerization commences, as noted by an exotherm. After at least 90 minutes, the solution is adjusted to 40° C. while adding 720 parts of methyl methacrylate and 0.36 part of diisopropylbenzene hydroperoxide. After again purging with nitrogen for 15 minutes, a solution of 0.072 part sodium formaldehyde sulfoxylate in five parts water is added and the mixture polymerized for at least one hour before isolation, which is conveniently accomplished by spray-drying. This sample is IV-D in the Table II below.

In a similar manner, the polymerizations are repeated with varying amounts of the butylene dimethacrylate. The results are set forth in Table II.

TABLE II

| Sample | IV-A | IV-B | IV-C | IV-D | IV-E | IV-F |
|---|---|---|---|---|---|---|
| Percent butylene dimethacrylate | 0.00 | 0.1 | 0.25 | 0.50 | 1.5 | 5.0 |

Likewise, in lieu of the sodium lauryl sulfate there may be substituted a sulfonate of an alkylbenzene ethylene oxide (3 units) adduct, or an alkylbenzene sulfonate sodium salt.

The same formulation shown above is used to prepare Samples IV-G, IV-H, and IV-J, except that the emulsifier is changed as follows:

IV-A=72 parts of a 10% solution of sodium lauryl sulfate
IV-G=36 parts of a 10% aqueous solution of sodium lauryl sulfate
IV-H=7.2 parts of a solid alkylbenzene sulfonate
IV-J=3.6 parts of a solid alkylbenzene sulfonate The polymerization behavior in all four cases is similar. When evaluated in blends with polyvinyl chloride, using 85 parts of polyvinyl chloride and 15 parts of modifier, substantially equivalent results are obtained in all four cases with regard to their impact behavior versus temperature response and in the stability to oven heating.

EXAMPLE V

Effect of cross-linked modifier on impact strength

The effect of cross-linkers on impact strength is determined by comparing the Izod notched impact values of cross-linked vs. non-cross-linked modifiers in blends with polyvinyl chloride which are milled and molded as in Example II above. The comparisons are made at various milling times. The formulation used for these comparisons is 80 parts of the polyvinyl chloride, 20 parts of the modifier, 1 part aluminum stearate, and 2 parts tin stabilizer. The modifiers tested are those identified as IV-A through IV-F in Table II above.

TABLE III

| Modifier | Percent butylene dimethacrylate | Izod notched impact values, milling time of— | | | | |
|---|---|---|---|---|---|---|
| | | 3 min. | 7 min. | 10 min. | 15 min. | 20 min. |
| IV-A | 0 | Would not flux on mill | | | | |
| IV-B | 0.1 | 20.8 | 21.0 | 20.6 | 23.6 | 18.5 |
| IV-C | 0.25 | 9.8 | 19.1 | | 27.2 | |
| IV-D | 0.50 | 9.1 | 10.0 | 10.4 | 10.6 | 11.2 |
| IV-E | 1.5 | | | 27.5 | | |
| IV-F | 5.0 | 4.2 | 4.9 | 10.5 | 10.5 | 16.2 |

EXAMPLE VI

Effect of cross-linker in broadening concentration range throughout which modifier imparts impact strength All the samples are milled for seven minutes and compression molded as in Example II above. The Izod impact strengths at various modifier concentrations are shown as tested at room temperature and at 0° C. The modifiers tested are those identified as IV-A through IV-F in Table II above. The results show the unexpected improvement in impact-resistance when the cross-linked modifier is used, as well as the wider range of useful concentrations and the effect on low temperature impact values. Similar results are obtained when the milled samples are injection molded or are used to make extruded sheet.

TABLE IV

[Izod notched impact strength vs. percent modifier in blend]

| Modifier | Room temperature | | | | | 0° C. | | | | |
|---|---|---|---|---|---|---|---|---|---|---|
| | 10% | 15% | 20% | 25% | 30% | 10% | 15% | 20% | 25% | 30% |
| IV-A | 2.1 | (¹) | (¹) | (¹) | (¹) | 0.7 | (¹) | (¹) | (¹) | (¹) |
| IV-B | 2.5 | 9.7 | 21.0 | 21.7 | 13.6 | 0.8 | 0.8 | 0.8 | 2.7 | 2.7 |
| IV-C | 0.4 | 29.4 | 19.1 | 23.8 | 14.3 | 0.8 | 1.3 | 2.2 | 1.1 | 2.8 |
| IV-D | 2.6 | 22.8 | 24.3 | 12.7 | 11.0 | 0.8 | 1.1 | 2.0 | 1.5 | 2.0 |
| IV-E | 2.9 | 30.3 | 27.5 | | | | | | | |
| IV-F | 1.4 | 2.8 | 19.4 | 2.9 | 2.6 | | | | | |

¹ Would not flux.

EXAMPLE VII

Use of other methacrylates in hard phase polymerization

A poly(butyl acrylate) latex is prepared as in Example IV, and Sample IV-D in Table II above. However, instead of methyl methacrylate equal parts by weight of one of the following monomers is substituted: ethyl methacrylate, propyl methacrylate, butyl methacrylate, and isobornyl methacrylate. After isolation by spray-drying, the modifiers are blended at various concentrations using the formulation of Example V above, milled seven minutes and injection molded. The room temperature notched Izod values are shown in Table VI below for different concentrations of each of the modifiers. It should be noted that isobornyl methacrylate, which is outside the scope of the present invention, gives unacceptably low values even though the interpolymer is based on cross-linked butyl acrylate and the methacrylate polymer is one possessing a high glass temperature.

TABLE V

| Hard phase methacrylate | Izod impact strength vs. percent modifier | | | | |
|---|---|---|---|---|---|
| | 10% | 15% | 20% | 25% | 30% |
| Methyl | 2.6 | 22.8 | 24.3 | 12.7 | 11.0 |
| Ethyl | 6.0 | 29.0 | 26.5 | 19.6 | 20.5 |
| Propyl | 1.3 | 2.0 | 2.3 | 3.2 | 2.3 |
| Butyl | 1.8 | 2.7 | 2.3 | 21.0 | 21.6 |
| Isobornyl | 0.7 | 0.6 | 0.5 | 0.2 | 0.5 |

Similar results are obtained when the sodium lauryl sulfate emulsifier is replaced by sodium alkylbenzene-sulfonate.

EXAMPLE VIII

Effect of other cross-linkers on heat stability

In the following formulations all polymers are blended as follows: 85 parts of a medium molecular weight polyvinyl chloride, 15 parts of a modifier prepared as explained below, 2 parts of aluminum stearate, 1 part of a tin stabilizer, 3 parts titanium dioxide, 4 parts of a barium based stabilizer, and 0.5 part of a cadmium-based stabilizer, are blended at 340° F. for seven minutes. Samples are cut from the resultant sheet and compression molded at 345° F. Izod notched impact tests are run at various temperatures. Oven stability tests are run at 350° F. for varying lengths of time.

The modifiers are prepared as in Example IV above. The first (Sample VIII–A) contains no mercaptan in the second stage, while the second (Sample VIII–B) contains 0.1% t-dodecylmercaptan. The third (Sample VIII–C) is prepared with potassium persulfate as the sole initiator of the butyl acrylate polymerization. All three samples are cross-linked with butylene dimethacrylate. The fourth (Sample VIII–D) and fifth (Sample VIII–E) are also prepared following the teachings of Examples IV, except that one part by weight of divinylbenzene and of diallyl maleate, respectively, replace the butylene glycol dimethacrylate. All five samples are prepared with 50 parts butyl acrylate, one part cross-linking monomer, 50 parts methyl methacrylate, and sodium lauryl sulfate as the emulsifier.

Table VI, which follows, shows the color changes on heating at 350° F. for various times. The ratings are: 1=white; 2=light yellow; 3=pink; 4=orange; 5=tan; 6=brown; 7=dark brown. Relative stability towards heat is shown in terms of the lower numbers reflecting the greater stability.

TABLE VI

| Sample | Color change at 350° F. | | | | | |
|---|---|---|---|---|---|---|
| | Initial | 1 hr. | 2 hrs. | 3 hrs. | 4 hrs. | 5 hrs. |
| VIII–A | 1 | 2 | 2+ | 3– | 3 | 3+ |
| VIII–B | 1 | 2 | 2+ | 3– | 3+ | 5 |
| VIII–C | 1 | 2 | 2+ | 3– | 3+ | 4 |
| VIII–D | 1 | 3 | 3+ | 4 | 6 | 7 |
| VIII–E | 1 | 2 | 3 | 3+ | 4 | 6 |

EXAMPLE IX

Effect of different amounts of modifiers and varied temperatures

Three sets of polyvinyl chloride-modifier blends are prepared as in Example VIII, one set at the same 15% modifier level as in that example, another set at the 10% modifier level, and the third set with 20% modifier. The impact strengths of each set are then measured at 76° F., 50° F. and 32° F., the value being recorded as in Table VII. The resistance to impact is shown at temperatures in descending order because it simplifies understanding of the data, it being a desirable feature for certain materials (such as those used in outdoor applications) to have improved resistance to impact at lower temperatures.

TABLE VII

| | Izod notched impact | | | | | | | |
|---|---|---|---|---|---|---|---|---|
| | 10% modifier | | 15% modifier | | 20% modifier | | | |
| Sample | 76° F. | 50° F. | 76° F. | 50° F. | 50° F. | 76° F. | 50° F. | 32° F |
| VIII–A | 24.0 | 2.9 | 22.0 | 18.5 | [1]11.1 | 24.1 | 21.1 | [1]12.9 |
| VIII–B | 22.2 | [1]4.6 | 23.0 | 17.6 | 7.2 | 23.0 | 18.4 | [1]13.4 |
| VIII–C | 23.8 | 2.1 | 25.4 | 17.7 | 2.3 | 25.2 | 20.3 | 14.8 |

[1] Scattered results.

EXAMPLE X

Behavior of plasticized polyvinyl chloride on exposure to accelerated weathering Samples prepared as in Example VIII and containing 20% modifier were exposed to a xenon-lamp weatherometer for periods of 240, 500, 750 and 1000 hours, and then tested for notched Izod impact at three test temperatures. All samples appeared unchanged after this exposure. The data are set forth in Table VIII below.

TABLE VIII

| | | Samples | | |
|---|---|---|---|---|
| Test temp., ° F. | Exposure time, hrs. | VIII–A | VIII–B | VIII–C |
| | | Izod notched impact | | |
| 76 | Control | 24.7 | 22.8 | 22.2 |
| | 250 | 19.5 | 21.3 | 22.5 |
| | 500 | 22.5 | 21.9 | 21.8 |
| | 750 | 23.0 | 21.3 | 22.6 |
| | 1,000 | 22.4 | 21.3 | 22.8 |
| 50 | Control | 20.4 | 17.8 | [1]17.2 |
| | 250 | 19.2 | [1]12.7 | 17.4 |
| | 500 | [1]15.2 | [1]10.5 | 17.0 |
| | 750 | 18.2 | [1]9.3 | 15.0 |
| | 1,000 | 18.8 | 16.2 | 16.7 |
| 32 | Control | [1]9.3 | [1]3.6 | [1]6.7 |
| | 250 | [1]8.4 | [1]7.8 | 3.1 |
| | 500 | [1]6.9 | 3.5 | [1]6.8 |
| | 750 | [1]5.1 | 2.0 | 4.0 |
| | 1,000 | [1]2.4 | [1]4.4 | 2.4 |

[1] Scattered test results.

EXAMPLE XI

Polyvinyl chloride modified with butyl acrylate-cross-linker/methyl methacrylate A butyl acrylate:butylene glycol dimethacrylate latex was prepared as in Example IV. To the sample, while adjusting to 40° and purging with nitrogen, are added 310 parts of methyl methacrylate and 0.18 part of cumene hydroperoxide. Polymerization is then carried out as in Example IV by addition of 0.3 part of sodium formaldehyde sulfoxylate in a dilute aqueous solution. The polymer is isolated by addition of 1000 parts of hot methanol, filtered and washed with water. After drying, the interpolymer is blended as follows: 15 parts modifier; 85 parts of the polyvinyl chloride; 2 parts aluminum stearate; one part of a tin stabilizer; 3 parts of $TiO_2$, 4 parts of a barium-based stabilizer, 0.5 part of a cadmium-based stabilizer. Processing and testing are carried out as described in Example VIII. The data obtained are set forth in Table IX below.

TABLE IX

| Temperature of impact test, ° F. | Percent modifier | |
|---|---|---|
| | 7.2 | 10.7 |
| Room temperature | 16.1 | 25.4 |
| 50 | 1.7 | 12.9 |
| 32 | | 1.8 |

The foregoing examples illustrate the superiority in impact at reduced temperatures, and in retention of color at elevated temperatures, relative to any analogous prior art compositions. Other unexpected advantages over the prior art include greater ease in processing, wider ranges of useful blend compositions, and wider ranges of blending times.

The above description of the invention and the examples are set forth only by way of illustration. Quite obviously, to those skilled in the art many other variations and modifications will be apparent, and they can readily be employed without departing from the spirit and scope of the invention described above and claimed below.

We claim:

1. A process for making a modifier for polyvinyl halide compositions and the like comprising forming a latex by copolymerizing in emulsion (a) a $C_2$ to $C_8$ alkyl ester of acrylic acid in the presence of from 0.5 to 1% of an emulsifier being below the critical micelle concentration for the particular soap and polymer used, and (b) in the presence of from 0.1 to 5% of a crosslinking monomer selected from the group consisting of dimethacrylic, trimethacrylic, diacrylic and triacrylic esters of polyhydric alcohols, and polymerizing in the presence of said preformed latex a $C_1$ to $C_4$ alkyl ester of methacrylic acid, said latex being copolymerized with the aid of a redox initiator system in which the oxidizing agent is essentially water-insoluble.

2. The process of claim 1 in which the initiator system is selected from the class consisting of cumene hydroperoxide-sodium metabisulfite, diisopropylbenzene hydroperoxide-sodium formaldehyde sulfoxylate, tertiary butyl peracetate-sodium formaldehyde sulfoxylate, tertiary butyl peracetate-sodium hydrosulfite, and cumene hydroperoxide-sodium formaldehyde sulfoxylate.

3. The process of claim 1 in which, when the latex is based on poly(ethyl acrylate), the particle size radius of the latex is in the range of 400–2000 A.

4. A thermoplastic composition comprising a blend consisting essentially of (A) 95 to 60 parts by weight of a member of the class consisting of (1) a polyvinyl halide and (2) copolymers of at least 80% by weight of a vinyl halide with up to 20% by weight of another monovinylidene compound copolymerizable therewith and (B) correspondingly, about 5 to 40 parts by weight of a polymeric product of components consisting essentially of (I) 60 to 25 parts by weight of a member from a first group consisting of (a) $C_1$ to $C_4$ alkyl esters of methacrylic acid and (b) mixtures of at least 80% by weight of a $C_1$ to $C_4$ alkyl methacrylate with another monomer which is copolymerizable therewith and which has a single vinylidene group as its sole polymerizable reactive group, the member from said first group having been emulsion polymerized to form a hard polymer having a glass temperature of at least 20° C. by carrying out the polymerization in intimate contact with (II) 40 to 75 parts by weight of a member selected from a second group consisting of (i) preformed rubbery polymers of $C_2$ to $C_8$ alkyl esters of acrylic acid and from 0.1 to 5% of a crosslinking monomer selected from the group consisting of dimethacrylic esters of polyhydric alcohols, trimethacrylic esters of polyhydric alcohols, diacrylic esters of polyhydric alcohols and triacrylic esters of polyhydric alcohols, the rubbery polymers having been formed in an emulsion with from 0.5 to 1% of the emulsifier present based on the final weight of both monomers charged, and having a glass temperature below 0° C., and (ii) copolymers of at least 80% by weight of said crosslinked alkyl acrylate with another monomer which is copolymerizable therewith and which has a single vinylidene group as its polymerizable reactive group.

5. The composition of claim 4 in which the crosslinking monomer is 1,3-butylene glycol dimethacrylate.

6. The thermoplastic composition of claim 4 in which (I) is methyl methacrylate and (II) is crosslinked poly(butyl acrylate).

7. The thermoplastic composition of claim 4 in which (I) is methyl methacrylate and (II) is crosslinked poly(ethyl acrylate).

8. The thermoplastic composition of claim 4 in which (I) is methyl methacrylate and (II) is crosslinked polymerized 2-ethylhexyl acrylate.

9. The thermoplastic composition of claim 4 in which (I) is ethyl methacrylate and (II) is poly(butyl acrylate).

10. The thermoplastic composition of claim 4 in which (I) is a mixture formed from up to 20 parts of ethyl methacrylate and at least 80 parts methyl methacrylate and (II) is poly(butyl acrylate).

References Cited
UNITED STATES PATENTS

| | | | |
|---|---|---|---|
| 3,041,309 | 6/1962 | Baer | 260—876 X |
| 3,055,859 | 9/1962 | Vollmert | 260—885 X |
| 3,251,904 | 5/1966 | Souder et al. | 260—876 |
| 3,334,156 | 8/1967 | Calentine et al. | 260—876 X |
| 3,450,796 | 6/1969 | Griffin | 260—885 |

FOREIGN PATENTS 1,371,866    8/1964    France.

MURRAY TILLMAN, Primary Examiner

H. W. ROBERTS, Assistant Examiner

U.S. Cl. X.R.

260—23 XA, 29.6 RB, 45.75 K, 881, 884, 885